United States Patent [19]

Colman et al.

[11] Patent Number: 5,439,991
[45] Date of Patent: Aug. 8, 1995

[54] METHOD OF MIXING HETEROGENEOUS SYSTEMS

[75] Inventors: Derek A. Colman, Hampshire; William Tallis, Surrey, both of United Kingdom

[73] Assignee: BP Chemicals Limited, London, England

[21] Appl. No.: 260,892

[22] Filed: Jun. 16, 1994

[30] Foreign Application Priority Data

Jun. 30, 1993 [GB] United Kingdom ............... 9313442

[51] Int. Cl.$^6$ .............................................. C08F 2/00
[52] U.S. Cl. ........................................ 526/64; 526/88
[58] Field of Search ................................ 526/64, 88

[56] References Cited

FOREIGN PATENT DOCUMENTS 0229139  7/1987  European Pat. Off. .
0540180  5/1993  European Pat. Off. .

Primary Examiner—Joseph L. Schofer
Assistant Examiner—Tom Weber
Attorney, Agent, or Firm—Brooks Haidt Haffner & Delahunty

[57] ABSTRACT

The present invention relates a process for uniformly mixing heterogeneous or multiphase systems comprising a continuous phase and at least a solid, dispersed phase in a pulsatile flow reactor (PUFR) as herein defined wherein the uniform mixing is carried out by actuating means for pulsing the continuous phase. The PUFR can be used in its horizontal or vertical orientation. The PUFR is useful for example to carry out the catalytic polymerization of olefins in a heterogeneous phase.

15 Claims, 1 Drawing Sheet

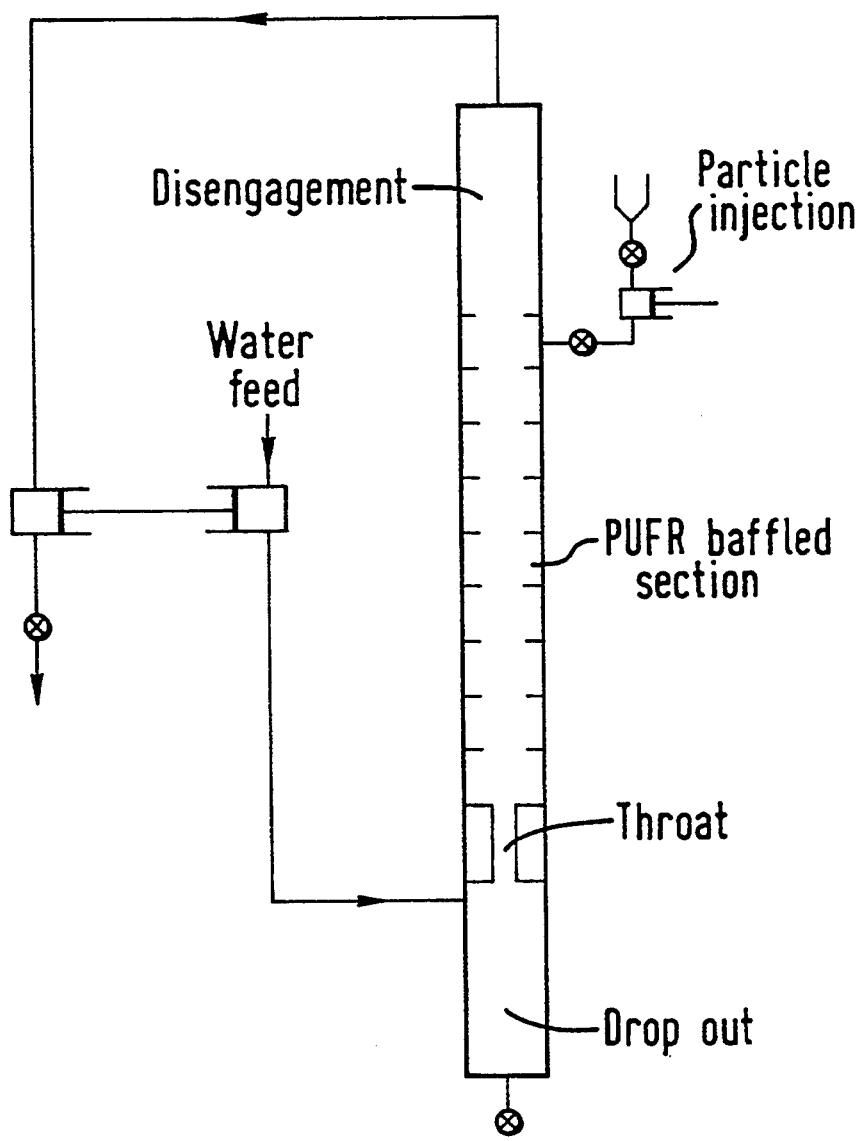

METHOD OF MIXING HETEROGENEOUS SYSTEMS

This invention relates to a method of uniformly mixing heterogeneous and multiphase systems which have a continuous phase and a dispersed phase such as liquid/solid, solid/gas or solid/liquid/gas systems.

It is well known in the art to use methods of mixing which use stirred reactors whether they be in the form of motorised paddles or other moving parts in a reactor. However, such methods suffer from the disadvantage that they are not particularly suited to the mixing of eg solid/gas or liquid/gas systems. Moreover, these involve moving parts which not only runs the risk of mechanical failure but also inefficient mixing. One method of overcoming the problems of such mechanical mixing systems is to use turbulent flow reactors which involve a high throughput in order to achieve near plug flow and this may cause either non-uniform mixing or inadequate reaction where the contents of the reactor being mixed are expected to interact chemically.

A further method which has been used recently is a pulsatile flow reactor (hereafter "PUFR") as described in our published copending EP-A-0 540 180 for the production of polyolefins. This publication does not disclose mixing and/or reaction of heterogeneous systems, especially if a reaction is desired between a solid/liquid, gas/solid or a gas/slurry system of the type encountered in the production eg of polyethylene.

It has now been found that the problems of prior processes can be mitigated by the use of a PUFR in which heterogeneous reactions can be carried out and in which the mean flow is less than the minimum fluidization velocity when the reactor is used in a vertical mode.

Accordingly, the present invention is a process for uniformly mixing heterogeneous or multiphase systems comprising a continuous phase and at least a solid, dispersed phase in a PUFR wherein the uniform mixing is carried out by actuating means for pulsing the continuous phase.

The process of the present invention is particularly suitable for uniformly mixing heterogeneous or multiphase systems in a PUFR when used in a vertical mode. In this mode, the uniform mixing is suitably carried out by actuating means for pulsing the continuous phase in the PUFR such that the mean flow of the system is less than the minimum fluidization velocity thereof.

By "minimum fluidization velocity" is meant here and throughout the specification the minimum upward velocity of the continuous phase required to enable fluidization of the particles in said continuous phase, ie the pressure drop of the continuous phase through a particle bed is equal to the weight of the particle bed.

The process is particularly suitable for mixing and/or reacting heterogeneous or multiphase systems in which at least one of the phases, preferably the continuous phase is liquid or gaseous. At least one of the other phase(s) is a solid. Where a three-phase system of reactants is used, the liquid is pulsed which keeps the solids in suspension and breaks up any gas that may be present into small bubbles within the PUFR. The process of the present invention is thus particularly applicable to gas phase fluidized bed reactions and gas/slurry reactions such as eg in the production of polyethylene from ethylene, or, solid catalysed reactions such as eg in carbonylation.

The PUFR mixing apparatus is an elongate vessel, of suitably cylindrical cross-section. The reactants may be introduced into the vessel from an inlet which may be located at either end or at any other point along the length of the reaction vessel, although it is usually located at one end, eg at the bottom of the vessel (in its vertical orientation). Correspondingly the vessel is provided with an outlet which may again be located at the opposite end or at any point along the length of the vessel but is usually at the other end from the inlet, ie typically at the top end (in its vertical orientation), for removing the products of the reaction. The elongate vessel is provided with means for imposing on the reactants within the vessel a pulsatile oscillatory motion in a predetermined direction, preferably in a direction substantially parallel to the direction of fluid flow, and a plurality of stationary obstacles, ie baffles, mounted substantially transversely to the direction of fluid flow. By imposing an oscillating motion to the material contained in the vessel, the reactants are caused to cross and re-cross the stationary baffles thereby providing vigorous mixing. Such an apparatus is claimed and described in published EP-A-0 229 139 and also in our published copending EP-A-0 540 180 and the matter disclosed in these publications are incorporated herein by reference.

The PUFR can be used in a horizontal orientation or a vertical orientation. In the horizontal orientation, the reactants enter one end of the reactor, flow along the length of the reactor and emerge at the other end. In this case, the baffles in the reactor are suitably spaced from the base of the reactor to prevent accumulation of solids at the point where the baffle meets the base of the reactor. Thus, the fluid flow through the reactor will wash off/displace any accumulated solids through the space between the base of the reactor and the baffle.

The PUFR is suitably used in its horizontal orientation for pre-polymerization reactions by using (i) the pulsing action to maintain the particles (inclusive of the catalyst and the prepolymer particles) in the reactor in suspension (catalyst/pre-polymer particles having a size in the range of 50–250 $\mu$m, preferably >70 $\mu$m) and (ii) a plug flow of the continuous phase, eg liquid phase, to control the residence time of the particles. In the case of slurry phase polymerization of ethylene, ethylene gas can be injected through a sparge pipe positioned along the length of the PUFR in order to maintain concentration and the mixing action would enable dissolution of ethylene in the continuous phase. In this case, the reactor pressure can be controlled so as to maintain it above the vapour pressure of ethylene thereby minimising free gas space above the liquid. In this process, it would be possible to achieve temperature control and to impose an axial temperature profile within the reactor, if necessary. In polymerising ethylene, if hydrogen is dissolved in the solvent before ethylene is injected, then the required hydrogen/ethylene partial pressure ratio can be maintained throughout the reactor by controlling the stoichiometric hydrogen ratio (−20 ppm w/w) with the ethylene in the reactor. By using a plug flow residence time, the particle size range can also be controlled since mixing within the PUFR is unlikely to cause particle attrition. When the PUFR is used for polyethylene pre-polymerization, if it is desired to reduce the number of particles below, say, 80 $\mu$m entering the main polymerization reactor, a continuous sedimentation could be used at the end of the pre-polymerization PUFR which would remove the fines in an excess solvent flow, while also concentrating the solvent/prepolymer slurry emerging from the PUFR for injection into the main polymerization reactor which may be a gas phase reactor for example.

For the purposes of the present invention the PUFR in its vertical orientation has the pulsating means being located at the base of the reactor and an outlet at the top of the reactor. The inlet for the reactants may be spaced along the length of the reactor as desired and convenient. The PUFR is preferably provided at its base with an unbaffled region which is narrower in diameter than the rest of the reactor and is the so called "throat" section. This section prevents drop out of small particulate components of the reactants and may facilitate selective removal of large particulate components thereof.

The PUFR may also be provided with a further unbaffled region at the top thereof in which particulate components of the reactants which are dispersed or fluidized by the pulsating action around the baffles are able to disengage from the fluid because, in the absence of baffles, the pulsing action does not cause any significant mixing. This section is the so called "disengagement" section. A schematic test rig of this type being used in the vertical mode is shown in the accompanying drawing.

The PUFR used in the present invention may suitably have a internal diameter of about 25 mm, a throat section having an internal diameter of about 7 mm, a length of about 1000 mm and annular baffles which are spaced about 37 mm apart giving a blockage of 60%.

The particles size of the solid reactants is suitably in the range from 100–2000 $\mu$m, preferably from 200 to 1000 $\mu$m.

The pulsing frequency will be dependent upon the reactants, the density of each component therein and the viscosity of the fluid components thereof. Thus in the case where the continuous phase is a liquid, the pulsing frequency is suitably 2–10 Hz, preferably 3–8 Hz and the amplitude is suitably at least 2 mm, preferably 4 mm in order to fully disperse the particulate reactants in the continuous liquid phase. Where the continuous phase is gaseous, the pulsing frequency will be dependent upon the reaction pressure which is typically 1 bar g. Under these conditions, the typical pulsing frequency is suitably from 15–30 Hz, preferably from 20–25 Hz and the amplitude is suitably in the range from 5–30 mm, preferably from 10–15 in order to fully disperse the particulate reactants in the continuous gas phase.

The mean flow in the PUFR will depend upon the particle size of the solid reactants and the nature of the continuous phase. For instance, for a continuous liquid phase, the mean flow is suitably in the range from 0–1 l/min, preferably from 0.05–0.2 l/min, in order to prevent the particles from dropping out or to enable selective removal of particles of a relatively larger size from a regime of small particulate reactants. Hoewever, when the continuous phase is gaseous, for a polyethylene particle size of <1 mm, the mean flow is suitably >8 l/min, preferably >4 l/min pressure of 1 bar g.

The temperature in the PUFR is not critical and will be dependent upon the type of reaction being carried out. Reactions can be carried out at ambient temperature, eg 20° C. and pressure.

For maximum efficiency the expansion factor, E, defined as the ratio of the volume occupied by the reactants when fluidized to that when the reactants are stationary, should be maximised.

The advantages of the PUFR for a heterogeneous reaction system can be summarised as follows:
a. Good particle/liquid heat transfer
b. Good liquid/coolant heat transfer
c. Ability to achieve particle plug flow when used in a horizontal orientation
d. Ability to vary temperature/composition with residence time
e. Ability to employ particle classification
f. Ability to operate a continuous process
g. Ability to achieve uniform mixing of reactants
h. Ability to use a closed system
i. Ability to maintain solids in suspension
h. Ability to minimise shear on particles The present invention is further illustrated with reference to the following Examples:

EXAMPLE 1

Tests carried out with polymethyl methacrylate (hereafter "PMMA") which has a density of 1.3 kg/l, an average particle size of 170 $\mu$m showed that in a system involving this polymer and water at 20° C., a flow of 0.06 l/min, was just sufficient flow to prevent drop out. At a pulse frequency of 4 Hz at 2 mm amplitude the particles of the polymer were well dispersed. However, when the PMMA particle size was 740 $\mu$m, 70% of these dropped out through the throat within 10 minutes. The test rig used for this purpose is shown in the accompanying schematic drawing.

EXAMPLE 2

Model Tests to test the slurry phase polyethylene process were carried out with RIGIDEX® grade polyethylene (having the physical characteristics shown below) in hexane with nitrogen injection (50 ml/min) with the following results:
Density of polyethylene—0.95 kg/l
Average Particle Size—100–1000 $\mu$m
Amount of polyethylene used—100g
Density of n—hexane used—0.66 kg/l
Viscosity of n—hexane used—0.33 cP
Mean liquid flow—zero The above was introduced into a PUFR which was provided with a gauze to prevent particles of the polyethylene from dropping out of the lower end of the reactor. The PUFR was pulsed at 7 Hz and 4 mm amplitude. The particles dispersed throughout the reactor and nitrogen gas was also well dispersed. A test rig used for this purpose is shown in the accompanying schematic drawing.

EXAMPLE 3

The process was repeated using linear low density polyethylene (LLDPE, Innovex Grade) particles and nitrogen at 1 bar g. The physical characteristics of the reactants and the results achieved are shown below:
Particle size of polyethylene—<1 mm
Mean gas flow (actual volume)—4 l/min
Under these conditions there was no bed movement.
When the conditions of the test were altered to increase the pulse frequency to 20 Hz there was general agitation of the bed at amplitudes below 5 mm . When the amplitude was increased to above 7.5 mm, the mixing was good and the bed expanded to E=1.5. At a mean flow of <3 l/min, particles began to drop out through the 7 mm throat section.

A test rig used for this purpose is shown in the accompanying schematic drawing.

Using polyethylene of particle size 1–2 mm, an amplitude of 10 mm and a pulse of 20 Hz was necessary to achieve good mixing the expansion factor, E, of 1.3. It was observed, visually, that the best mixing occurred at 25 Hz and an amplitude of 10 mm. At zero mean flow in this gas/solid system, there was minimal expansion and generally poor mixing.

EXAMPLE 4

To evaluate horizontal operation of the PUFR, a test using particles (70–200 μm) in water (differential density 300 kg/m$^3$) in a horizontally disposed PUFR (25mm internal diameter) was carried out. This test demonstrated upon visual examination that the particles were well mixed radially and were transported through the PUFR by the mean flow of liquid (0.1 l/min, mean residence time 3.5 min). The pulse amplitude was 3 mm and frequency was 3 Hz. In this case, the base of baffles were in abutment with the base of the reactor which resulted in a tendency for the particles to collect behind the baffles. The baffles were modified by a cutaway at its base which resulted in the clearing of the particles from behind the baffles and improved the mixing considerably.

By modelling this PUFR in its horizontal orientation as a series of conventional continuous stirred tank reactors (CSTR's, one for each baffle spacing), with forward and backward mixing equal to the pulsing, the residence time of a notional 20 cell system so formed was calculated and compared with a theoretical system without back-mixing (pulse amplitude 0). The results showed that with pulsing, there was an early breakthrough of material as well as a long tail in the residence time. This was much in accord with the observed results of particle residence time during the tests which showed some particles passing through in half the mean residence time but with a few having a residence time twice the mean value.

When the model was extended to a system with 200 notional baffle cells (which is closer to an expected real system), it was found that the pulsed flow had a residence time distribution much closer to the CSTR's in series model (amplitude 0) and plug flow, as would be desired.

EXAMPLE 5

The process of Example 4 above was repeated using particles of a size in the range of 200–400 μm, an amplitude of 4 mm and a frequencey of 3 Hz. The results obtained were the same as that observed in Examaple 4.

These results show that, irrespective of particle size within the limits specified, uniform mixing, suspension and transportation of the solid, dispersed phase can be achieved by using a pulsatile flow reactor.

We claim:

1. A process for uniformly mixing heterogeneous or multiphase systems comprising a continuous phase and at least a solid, dispersed phase in a pulsatile flow reactor (PUFR) wherein the uniform mixing is carried out by actuating means for pulsing the continuous phase in the reactor.

2. A process for uniformly mixing heterogeneous or multiphase systems according to claim 1 wherein the PUFR is operated in its vertical orientation with reactants entering the base of the reactor and the products emerging from the top of the reactor, and the uniform mixing is carried out by actuating means for pulsing the continuous phase in the PUFR such that the mean flow of the system is less than the minimum fluidization velocity thereof.

3. A process according to claim 2 wherein in a three-phase system of reactants comprising a solid phase, a liquid phase and a gas phase, the liquid phase is pulsed such that it keeps the solids in suspension and breaks up any gas that may be present into small bubbles within the reactor.

4. A process according to claim 2 wherein said reactor is provided with
   a. means for imposing on the reactants within the vessel a pulsatile oscillatory motion in a direction substantially parallel to the direction of fluid flow and
   b. a plurality of stationary obstacles mounted substantially transversely to the direction of fluid flow.

5. A process according to claim 2 wherein the reactor when used in a vertical mode has
   a. pulsating means located at the base of the reactor,
   b. an inlet for reactants spaced along the length of the reactor and
   c. an outlet located at the top of the reactor.

6. A process according to claim 2 wherein the reactor is provided at its base with an unbaffled region which is narrower in diameter than the rest of the reactor so as to form a "throat" section whereby said section prevents drop out of small particulate components of the reactants from the reactor base and facilitates selective removal of large particulate components thereof from said base.

7. A process according to claim 5 wherein the reactor is provided with an unbaffled region at the top thereof to form a "disengagement" section in which particulate components of the reactants which would otherwise be dispersed or fluidized by the pulsating action around the baffles are, in the absence of said baffles, able to disengage from the fluid.

8. A process according to claim 5 wherein the reactor has an internal diameter of about 25 mm, a throat section having an internal diameter of about 7 mm, a length of about 1000 mm and annular baffles which are spaced about 37 mm apart giving a blockage of 60%.

9. A process according to any one of the preceding claims 2–8 wherein the particles size of the solid reactants is in the range from 100–2000 μm.

10. A process according to claim 2 wherein the pulsing frequency, in the case where the continuous phase is a liquid, is 2–10 Hz and the amplitude is at least 2 mm in order to fully disperse the particulate reactants in the continuous liquid phase.

11. A process according to claim 2 wherein the pulsing frequency, in the case where the continuous phase is gaseous and is at a reaction pressure of 1 bar g, is from 15–30 Hz and has an amplitude of 5–30 mm in order to fully disperse the particulate reactants in the continuous gas phase.

12. A process according to claim 2 wherein the mean flow in the reactor, when the continuous phase is:
   a. a liquid, is in the range from 0–1 liter/min in order to prevent the particles from dropping out or to enable selective removal of particles of a relatively larger size from a regime of small particulate reactants and
   b. gaseous, is >8 liters/min under a reaction pressure of 1 bar g.

13. A process according to claim 2 wherein the process is operated to maximise efficiency in such a manner that expansion factor, E, defined as the ratio of the volume occupied by the reactants when fluidized to that when the reactants are stationary, is maximised.

14. A process for uniformly mixing heterogeneous or multiphase systems according to claim 1 wherein the PUFR is operated in its horizontal orientation with reactants entering one end of the reactor and the products emerging from the other end of the reactor, and the uniform mixing is carried out by actuating means for pulsing the continuous phase in the PUFR such that the mean flow of the system is sufficient to maintain the solid, dispersed phase in suspension and to transport said solids in the continuous phase.

15. A process according to claim 14 wherein the baffles in the PUFR are spaced from the base of the reactor in order to prevent accumulation of particles at the base of the baffles.

* * * * *

UNITED STATES PATENT AND TRADEMARK OFFICE
CERTIFICATE OF CORRECTION

PATENT NO. : 5,439,991
DATED : August 8, 1995
INVENTOR(S) : Derek A. Colman and William Tallis It is certified that error appears in the above-indentified patent and that said Letters Patent is hereby corrected as shown below: Col. 3, line 62, after "min" and before "pressure" insert --under a--

Signed and Sealed this

Twenty-fourth Day of October, 1995

Attest:

BRUCE LEHMAN

Attesting Officer     Commissioner of Patents and Trademarks